US010896792B2

(12) United States Patent
Sakai et al.

(10) Patent No.: US 10,896,792 B2
(45) Date of Patent: Jan. 19, 2021

(54) INSTRUMENT PANEL STRUCTURE

(71) Applicant: HONDA MOTOR CO., LTD., Tokyo (JP)

(72) Inventors: Shinya Sakai, Wako (JP); Yuichi Nobusawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/814,057

(22) Filed: Mar. 10, 2020

(65) Prior Publication Data
US 2020/0312590 A1 Oct. 1, 2020

(30) Foreign Application Priority Data
Mar. 27, 2019 (JP) .................................. 2019-061872

(51) Int. Cl.
*H01H 21/08* (2006.01)
*H01H 21/22* (2006.01)

(52) U.S. Cl.
CPC ............ *H01H 21/08* (2013.01); *H01H 21/22* (2013.01); *H01H 2213/006* (2013.01); *H01H 2231/026* (2013.01)

(58) Field of Classification Search
None
See application file for complete search history.

(56) References Cited

U.S. PATENT DOCUMENTS

| 5,516,145 A * | 5/1996 | Williams | B60R 21/205 280/728.2 |
| 6,119,060 A * | 9/2000 | Takayama | B60K 35/00 701/36 |
| 6,196,588 B1 * | 3/2001 | Sugawara | B60H 1/00028 180/90 |
| 2002/0171627 A1 * | 11/2002 | Noguchi | B60K 37/06 345/156 |
| 2004/0192185 A1 * | 9/2004 | Le | B60H 1/00064 454/156 |
| 2006/0186689 A1 * | 8/2006 | Gresham | B60K 37/00 296/70 |
| 2008/0202139 A1 * | 8/2008 | Darroman | B60H 1/00828 62/244 |
| 2009/0196058 A1 * | 8/2009 | Ishida | B60Q 3/78 362/488 |
| 2018/0009288 A1 * | 1/2018 | Bhasin | B60H 1/00742 |
| 2019/0160919 A1 * | 5/2019 | Hayashima | F24F 13/075 |
| 2020/0275565 A1 * | 8/2020 | Takahara | H05K 5/0021 |

FOREIGN PATENT DOCUMENTS

JP 2008-112583 5/2008

* cited by examiner

*Primary Examiner* — Lori L Lyjak
(74) *Attorney, Agent, or Firm* — Rankin, Hill & Clark LLP

(57) ABSTRACT

An instrument panel that reduces dust entering the inside of a switch and improves aesthetics of the instrument panel. An instrument panel includes: an outlet portion configured to blow out conditioned air to an interior of a vehicle; a switch attachment portion at which a switch member is disposed; a cover member configured to cover a part of the outlet portion and the switch attachment portion and distribute air from the outlet portion to the interior of the vehicle; and an exhaust hole covered with the cover member and provided at a portion of the switch attachment portion.

6 Claims, 5 Drawing Sheets

INSTRUMENT PANEL STRUCTURE

CROSS-REFERENCE TO RELATED APPLICATION

The present application claims priority under 35 U.S.C. § 119 to Japanese Patent Application No. 2019-061872 filed on Mar. 27, 2019, the entire contents of which are hereby incorporated by reference.

BACKGROUND OF THE INVENTION

Field of the Invention

The present invention relates to an instrument panel structure.

Description of the Related Art

In the related art, various switches such as a hazard switch are disposed in an instrument panel. The hazard switch is provided such that the hazard switch can easily be operated from a side of a driver's seat and from a side of a front passenger seat, and is disposed separately from the other switches. In a case in which the hazard switch is provided near a wind outlet of an air conditioner, the switch may be affected by dust in air blown out of the air conditioner.

A button switch used in a vehicle and configured such that the switch is protected from dust is known (see Japanese Patent Laid-Open No. 2008-112583, for example).

In a case in which the switch disclosed in Japanese Patent Laid-Open No. 2008-112583 is provided in an instrument panel, uneven shapes increase around the switch, which leads to degradation of aesthetics of the instrument panel.

An aspect of the invention was made in view of the aforementioned circumstances, and an object of thereof is to improve aesthetics of an instrument panel and to reduce dust entering the inside of a switch.

SUMMARY OF THE INVENTION

According to an aspect to solve the aforementioned problem, there is provided an instrument panel structure including: an outlet portion configured to blow out air from an air conditioning device to an interior of a vehicle; a switch attachment portion at which a switch member is disposed; a cover member which covers a part of the outlet portion and the switch attachment portion, the air from the outlet portion being able to pass through the cover member; and an exhaust hole provided at a portion of the switch attachment portion, the portion being covered with the cover member.

In the aforementioned instrument panel structure, the switch member may include a case portion and an operation portion, and the operation portion may cover the cover member.

Also, in the aforementioned instrument panel structure, the switch attachment portion may include an intermediate member between the case portion and the operation portion, and the operation portion, the intermediate member, and the case portion may be disposed in a labyrinth shape.

Also, in the aforementioned instrument panel structure, the operation portion may include a first projecting portion, the exhaust hole may be disposed further outward than the intermediate member in a vehicle width direction, and the first projecting portion may be disposed further inward than an outer end portion of the exhaust hole and further outward than the intermediate member in the vehicle width direction.

Also, in the aforementioned instrument panel structure, an end portion of the first projecting portion in a vehicle length direction may be located further forward in the vehicle than an end portion of the intermediate member in the vehicle length direction.

There is also provided an instrument panel structure in which an instrument panel of a vehicle includes an outlet portion configured to blow out conditioned air to an interior of a vehicle, a net-shaped cover member configured to cover the outlet portion, and a switch attachment portion, a part of which is covered with the cover member, the cover member including a space insulated from the outlet portion, wherein a switch member is disposed at the switch attachment portion such that the operation portion is caused to project from the cover member.

According to the instrument panel structure of an aspect of the invention, it is possible to prevent dust from entering a switch member and also to improve aesthetics of an instrument panel.

DETAILED DESCRIPTION OF THE PREFERRED EMBODIMENT

Figure 1:
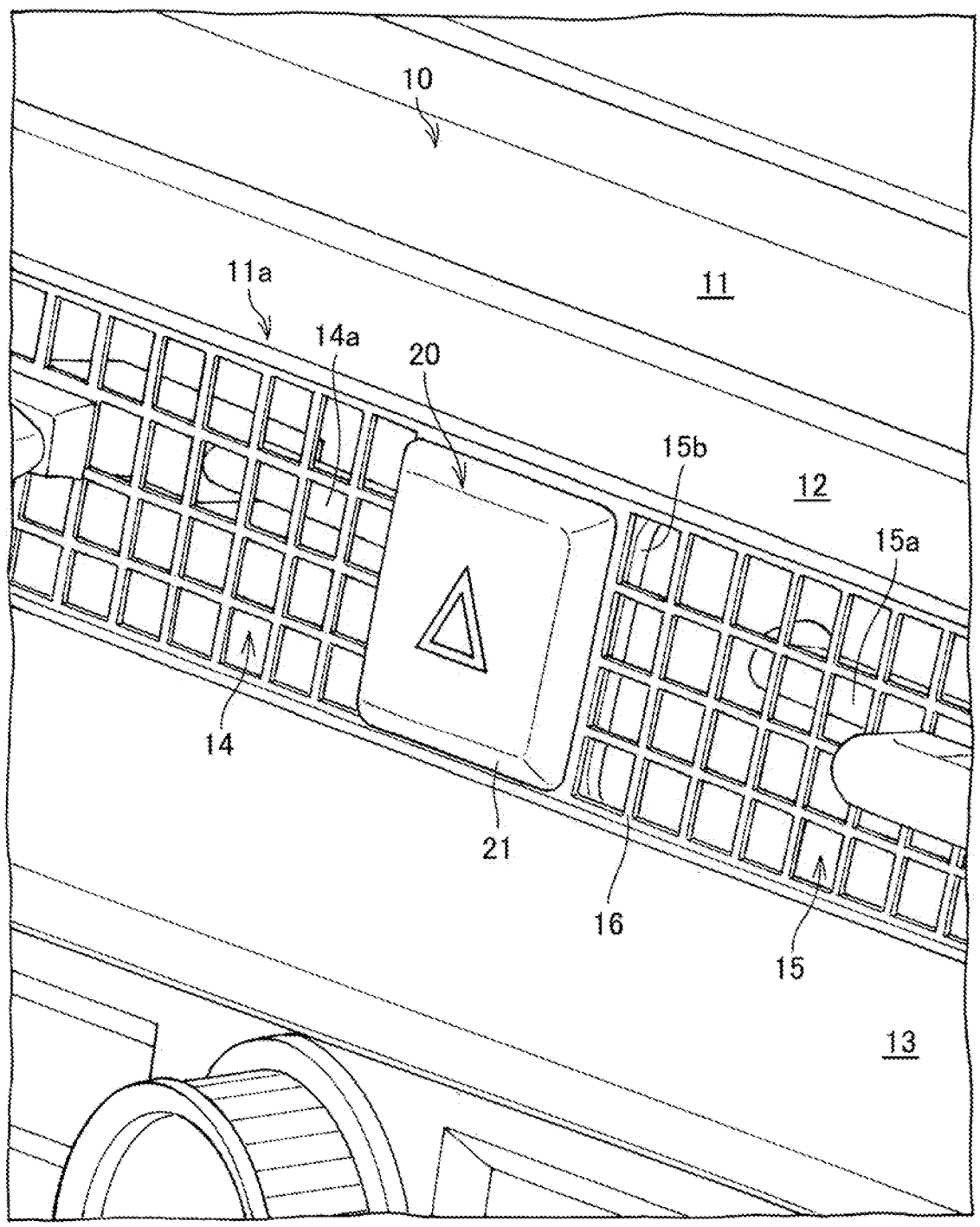
FIG. 1 is a perspective view illustrating a switch member provided in an instrument panel.

Hereinafter, an embodiment according to an aspect of the invention will be described with reference to drawings. In the drawings, the reference sign Up represents an upper side of a vehicle, the reference sign Fr represents a front side of the vehicle, and the reference sign Rh represents a right direction of the vehicle. A left-right direction of the vehicle corresponds to a vehicle width direction, and a front-back direction of the vehicle corresponds to a vehicle length direction.

FIG. 1 is a perspective view illustrating a part of an instrument panel 10 in a vehicle.

Figure 2:
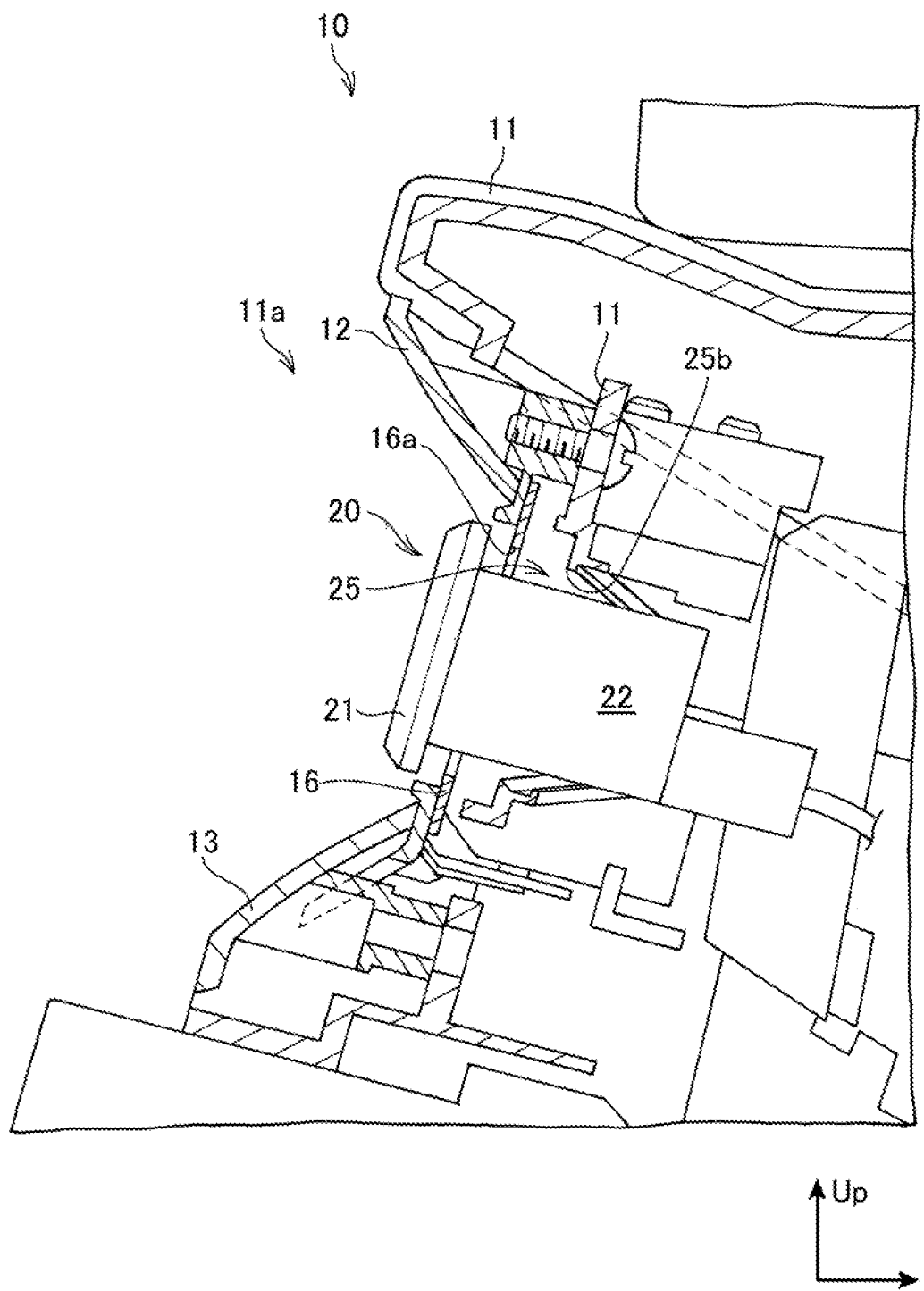
FIG. 2 is a side sectional view illustrating an attachment structure of the switch member.

The instrument panel 10 includes an instrument panel main body 11 made of resin. An upper cover 12 and a lower cover 13 are disposed at the instrument panel main body 11, and the upper cover 12 and the lower cover 13 are formed such that an interval therebetween increases toward the rear side as illustrated in FIG. 2. An outlet portion 11a that communicates with an air conditioning device, which is not illustrated, is provided between the upper cover 12 and the lower cover 13. Conditioned air is blown out of the outlet portion 11a to an interior of the vehicle.

The outlet portion 11a is covered with a cover member 16 through which the air can pass. As the cover member 16, any plate-shaped member through which the air can pass may be employed, and a net-shaped member such as punching metal or a wire mesh can be used.

An outlet port 14 and an outlet port 15, both of which have duct shapes, are provided at the outlet portion 11a. A louver 14a and a louver 15a are disposed at the outlet port 14 and the outlet port 15, respectively.

A switch attachment portion 25 is disposed between the outlet port 14 and the outlet port 15, each of which has the duct shape, as illustrated in FIG. 2.

The switch attachment portion 25 includes a space that is sectioned by the instrument panel main body 11 and that is insulated from the outlet port 14 and the outlet port 15. The conditioned air does not enter the inside of the switch attachment portion 25.

A switch member (hazard switch) 20 is disposed at the switch attachment portion 25 as illustrated in FIG. 1. A switch member 20 is located substantially at a central portion in the vehicle width direction and can be operated both from a driver's seat and from a front passenger seat. The switch member 20 includes an operation portion 21 and a case portion 22 as illustrated in FIG. 2.

Figure 3:
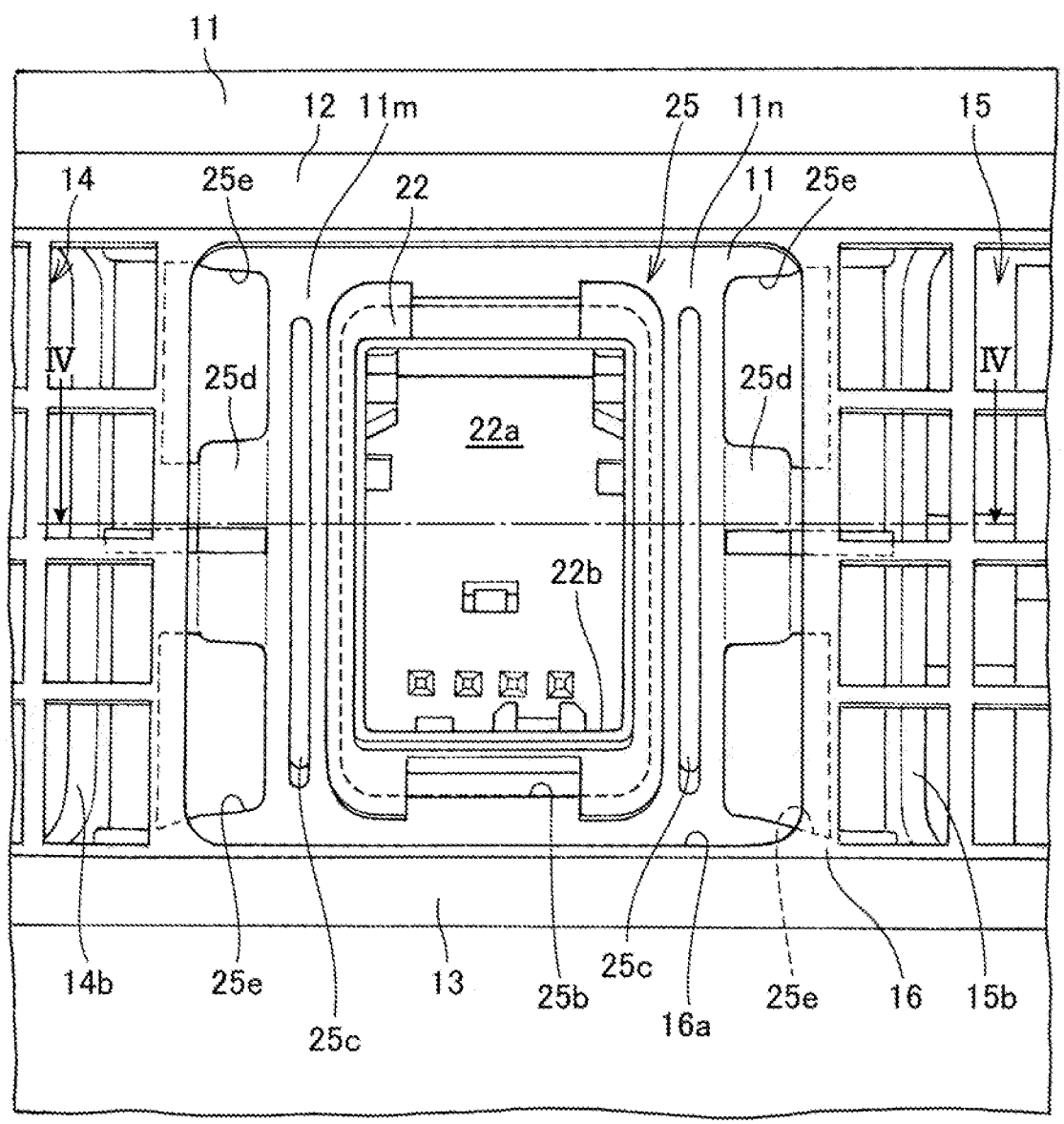
FIG. 3 is a back view illustrating a switch attachment portion.
Figure 3:
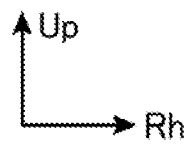

The case portion 22 is inserted into an opening 25b of the instrument panel main body 11 and is secured to the opening 25b as illustrated in FIG. 3.

The operation portion 21 is slidably fitted to the case portion 22 through a switch insertion port 16a of the cover member 16. The case portion 22 accommodates a switch main body 22a. The switch member 20 is adapted such that a front end portion 21a of the operation portion 21 is pressed into the case portion 22 and the switch main body 22a is operated.

A sliding direction of the operation portion 21 perpendicularly intersects a surface of the cover member 16. A switch knob 21b is provided at the operation portion 21. The switch knob 21b is formed into a substantially square shape, and the front end portion 21a is provided in a front surface of the switch knob 21b.

The switch knob 21b is configured to be larger than the switch insertion port 16a, and a peripheral edge portion of the switch knob 21b covers a peripheral edge portion of the switch insertion port 16a.

According to the embodiment, since the upper cover 12 and the lower cover 13 are present in the instrument panel 10, a line of sight is guided to the cover member 16 first, and then the line of sight is guided to the switch member 20 projecting further backward than the cover member 16. Therefore, the switch member 20 is easily recognized. Since the switch knob 21b projects above the cover member 16, the switch knob 21b that is independent in a region of the cover member 16 looks as if the switch knob 21b floated above the cover member 16. The inside of the switch attachment portion 25 cannot be seen by the peripheral edge portion of the switch knob 21b covering the peripheral edge portion of the switch insertion port 16a, and it is thus possible to improve aesthetics of the instrument panel 10.

Figure 4:
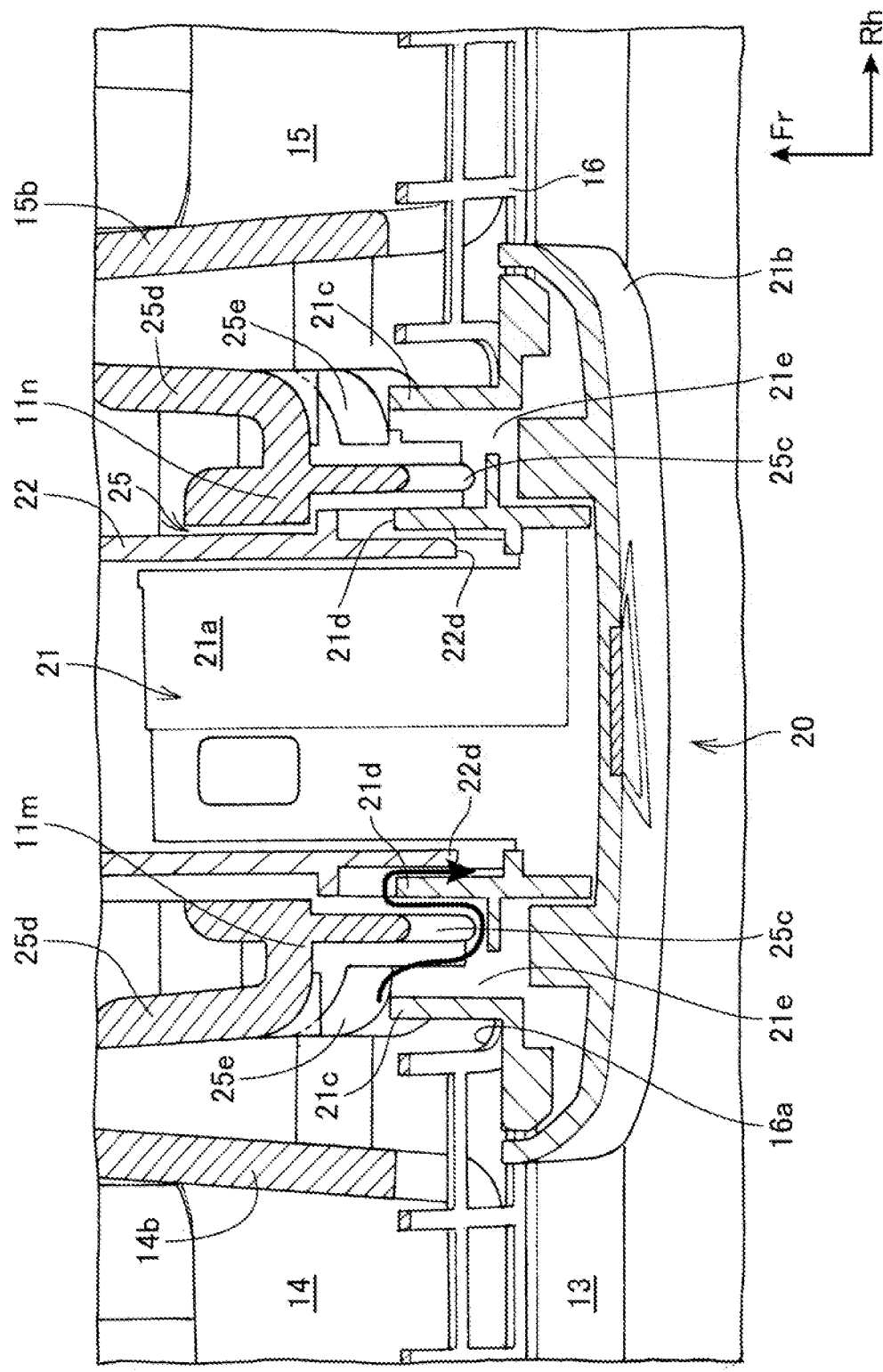
FIG. 4 is a sectional view along IV-IV in FIG. 3.

The switch attachment portion 25 is surrounded by a duct wall 14b configured to form the outlet port 14, a protruding portions 11m and 11n of the instrument panel main body 11, side wall portions 25d that similarly extends backward and outward on left and right sides, and a duct wall 15b configured to form the outlet port 15 as illustrated in FIG. 4. Each of rear ends of the duct wall 14b and the duct wall 15b substantially faces the peripheral edge portion of the switch knob 21b and is configured such that air blow out of the outlet port 14 and the outlet port 15 does not collide directly against the peripheral edge portion of the switch knob 21b.

Exhaust holes 25e that establish communication between the inside and the outside of the instrument panel main body 11 and are disposed on an upper side and a lower side are formed in each of the side wall portions 25d. A part of each exhaust hole 25e is covered with the cover member 16.

Figure 5:
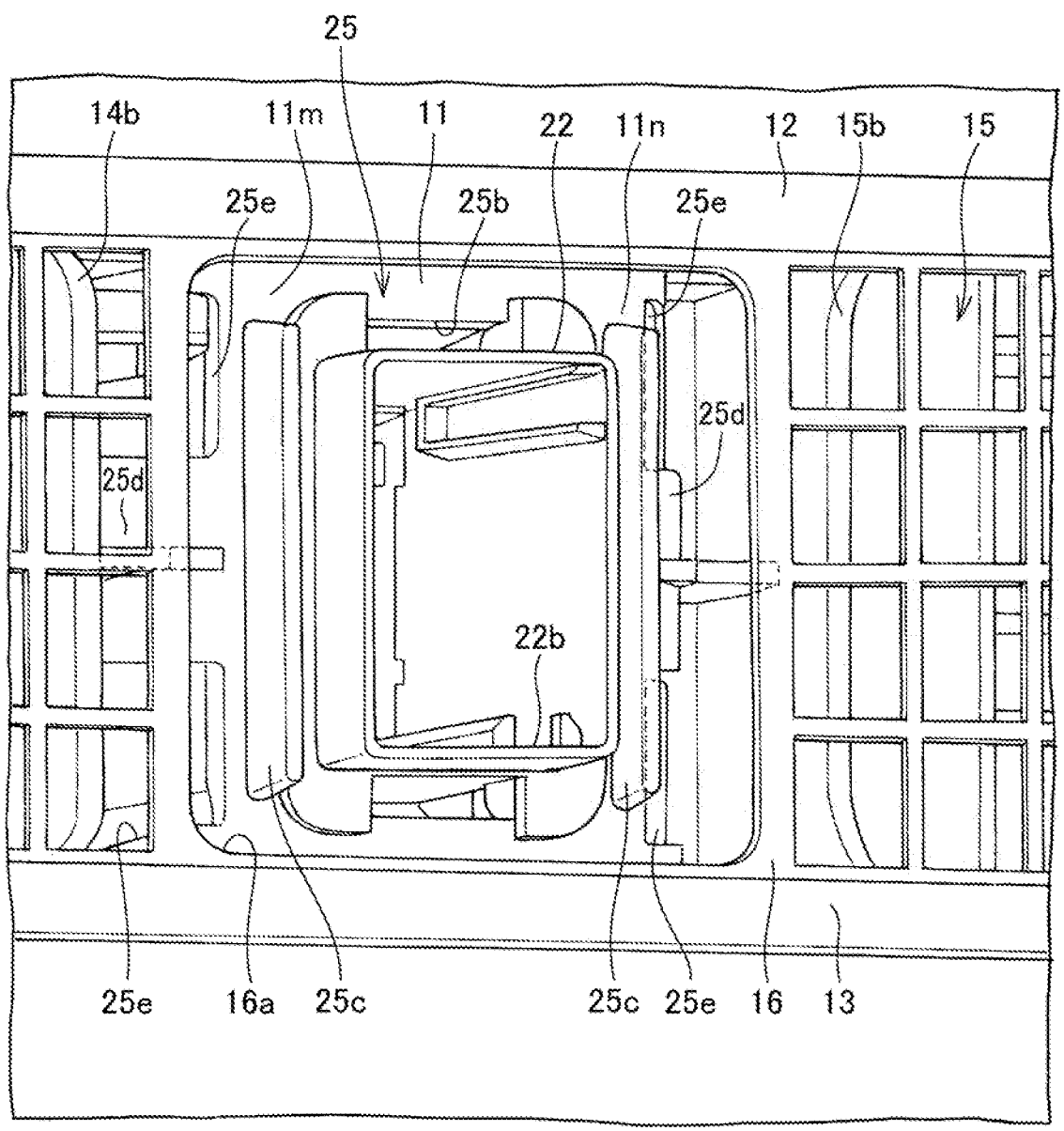
FIG. 5 is a perspective view illustrating the switch attachment portion.
Figure 5:
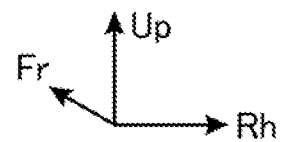

An intermediate member 25c is provided at each of the protruding portions 11m and 11n of the instrument panel main body 11. Each intermediate member 25c is provided between the opening 25b and the exhaust hole 25e and is formed such that the intermediate member 25c is longer than the insertion port 22b of the case portion 22 in the up-down direction in the drawing as illustrated in FIG. 5. The exhaust hole 25e is disposed further outward than the intermediate member 25c in the vehicle width direction.

As illustrated in FIG. 4, a first projecting portion 21c and a second projection 21d that are formed into tubular shapes so as to project further forward than the front surface of the switch knob 21b are formed in the front surface of the switch knob 21b of the operation portion 21. A space 21e is provided between the first projecting portion 21c and the second projection 21d, and the intermediate member 25c is fitted into the space 21e. The first projecting portion 21c is disposed further inward than the outer end portion of the exhaust holes 25e and further outward than the intermediate member 25c in the vehicle width direction.

Also, a case end portion 22d of the case portion 22 is located further inward than the second projection 21d in the vehicle width direction. The second projection 21d is located between the intermediate member 25c and the case end portion 22d.

The first projecting portion 21c, the intermediate member 25c, the second projection 21d, and the case end portion 22d form an alignment with a labyrinth shape. The labyrinth shape is a structure in which the first projecting portion 21c, the intermediate member 25c, the second projection 21d, and the case end portion 22d overlap with each other such that a route through which invaders such as dust pass becomes a zigzagged route.

Next, effects of the embodiment will be described.

The air conditioning device in the vehicle takes air from the outside or inside of the vehicle and blows out the air from the outlet port 14 and the outlet port 15 via a heat exchanger. A most part of the air blown out passes through the cover member 16 and is then blown out to the interior of the vehicle.

There is a concern that air that has passed through the cover member 16 advances around the peripheral edge portion of the switch knob 21b and flows from a gap of the switch knob 21b toward the case portion 22.

In the embodiment, the air that has been directed to the case portion 22 is discharged to the inside of the instrument panel 10 via the exhaust hole 25e provided at the instrument panel main body 11, and entrance of dust into the switch member 20 can be reduced.

The inside of the instrument panel 10 communicates with the inside of the vehicle, and the air discharged to the inside of the instrument panel 10 is returned to the inside of the vehicle.

In the embodiment, entrance of dust into the switch member 20 is reduced with the shape of the operation portion 21 and the shape of the switch attachment portion 25 even in a case in which the air blown out of the outlet port 14 and the outlet port 15 is further directed to the switch member 20.

In other words, since the first projecting portion 21c, the intermediate member 25c, the second projection 21d, and the case end portion 22d are disposed in the labyrinth shape, the route for entering the inside of the case portion 22 is elongated, and the route is a zigzagged route, entrance of dust into the switch member 20 is reduced.

The structure of the instrument panel 10 according to the embodiment is characterized by including the outlet portion 11a configured to blow out the air from the air conditioning device to the interior of the vehicle, the switch attachment portion 25 at which the switch member 20 is disposed, the cover member 16 which covers a part of the outlet portion 11a and the switch attachment portion 25, the air from the outlet portion 11a being able to pass through the cover member 16, and the exhaust hole 25d provided at a portion of the switch attachment portion 25 which is covered with the cover member 16.

With this configuration, the air escapes to the inner side of the instrument panel 10 through the exhaust holes 25e even if dust is directed toward the switch member 20 along with wind from the air conditioning device directed from the gap of the cover member 16 to the switch attachment portion 25.

In this manner, the air does not remain in the surroundings of the switch member 20, and entrance of dust into the switch member 20 can be reduced. It is possible to provide the instrument panel 10 with excellent aesthetics in which the cover member 16 covers the switch attachment portion 25.

In the aforementioned configuration, the switch member 20 may include the case portion 22 and the operation portion 21, and the operation portion 21 may cover the cover member 16.

With this configuration, the switch member 20 looks as if the switch member 20 was disposed above the cover member 16, which improves how an appearance in the surroundings of the switch member 20 looks.

In the aforementioned configuration, the switch attachment portion 25 may include the intermediate member 25c between the case portion 22 and the operation portion 21, and the operation portion 21, the intermediate member 25c, and the case portion 22 may be disposed in the labyrinth shape.

With this configuration, it is possible to reduce the amount of dust entering the switch member 20 due to the disposition in the labyrinth shape.

Also, in the aforementioned configuration, the operation portion 21 may include the first projecting portion 21c, the exhaust holes 25e are disposed further outward than the intermediate member 25c in the vehicle width direction, and the first projecting portion 21c may be disposed further inward than the outer end portions of the exhaust holes 25e and further outward than the intermediate member 25c in the vehicle width direction.

With this configuration, since the air entering from the interior of the vehicle collides against the first projecting portion 21c, and a flow of the air is then directed in the direction of the exhaust holes 25e, it is possible to efficiently discharge the air to the inside of the instrument panel 10.

Also, in the aforementioned instrument panel structure, the end portion of the first projecting portion 21c in the vehicle length direction may be located further forward in the vehicle than the end portion of the intermediate member 25c in the vehicle length direction.

With this configuration, since the first projecting portion 21c and the intermediate member 25c overlap with each other, it is possible to efficiently discharge the air to the exhaust holes 25e and also to reduce entrance of the air to the inner side of the switch member 20.

Also, the embodiment is characterized in the structure of the instrument panel 10 of the vehicle including the outlet portion 11a configured to blow out the conditioned air to the interior of the vehicle, the net-shaped cover member 16 configured to cover the outlet portion 11a, and the switch attachment portion 25, a part of which is covered with the cover member 16, the switch attachment portion 25 including a space insulated from the outlet portion 11a, in which the switch member 20 is disposed at the switch attachment portion 25 such that the operation portion 21 is caused to project from the cover member 16.

In this manner, no conditioned air is blown out to the interior of the vehicle from the switch attachment portion 25, and it is possible to reduce entrance of dust into the switch member 20. It is possible to provide the instrument panel 10 with excellent aesthetics in which the cover member 16 covers the outlet portion 11a and the switch attachment portion 25.

The aforementioned embodiment illustrates only aspects of the invention, and specific aspects of the invention and an application scope of the invention are not limited to the aforementioned embodiment. For example, the invention can be applied to a switch for operating an air conditioning device in a vehicle.

REFERENCE SIGNS LIST

10 Instrument panel
11 Instrument panel main body
14 Outlet port
15 Outlet port
16 Cover member
20 Switch member
21 Operation portion
21b Switch knob
21c First projecting portion
21d Second projection
22 Case portion
22a Switch main body
25 Switch attachment portion
25c Intermediate member
25d Side wall portion
25e Exhaust hole

What is claimed is:

1. An instrument panel structure comprising:
an outlet portion configured to blow out air from an air conditioning device to an interior of a vehicle;
a switch attachment portion at which a switch member is disposed;
a cover member which covers a part of the outlet portion and the switch attachment portion, the air from the outlet portion being able to pass through the cover member; and
an exhaust hole provided at a portion of the switch attachment portion, the portion being covered with the cover member.

2. The instrument panel structure according to claim 1, wherein the switch member includes a case portion and an operation portion, and
the operation portion covers the cover member.

3. The instrument panel structure according to claim 2, wherein the switch attachment portion includes an intermediate member between the case portion and the operation portion, and
the operation portion, the intermediate member, and the case portion are disposed in a labyrinth shape.

4. The instrument panel structure according to claim 3, wherein the operation portion includes a first projecting portion,
the exhaust hole is disposed further outward than the intermediate member in a vehicle width direction, and
the first projecting portion is disposed further inward than an outer end portion of the exhaust hole and further outward than the intermediate member in the vehicle width direction.

5. The instrument panel structure according to claim 4, wherein an end portion of the first projecting portion in a vehicle length direction is located further forward in the vehicle than an end portion of the intermediate member in the vehicle length direction.

6. An instrument panel structure
wherein an instrument panel of a vehicle includes
an outlet portion configured to blow out conditioned air to an interior of a vehicle,
a net-shaped cover member configured to cover the outlet portion, and
a switch attachment portion, a part of which is covered with the cover member, the switch attachment portion including a space insulated from the outlet portion,
wherein a switch member is disposed at the switch attachment portion such that the operation portion is caused to project from the cover member.

\* \* \* \* \*